United States Patent
Zeiss et al.

(10) Patent No.: US 8,595,933 B2
(45) Date of Patent: Dec. 3, 2013

(54) INJECTION VALVE, METHOD FOR ITS PRODUCTION, AND APPARATUS FOR PERFORMING THE METHOD

(75) Inventors: Bernhard Zeiss, Memmelsdorf (DE); Wilhelm Christ, Ludwigsburg (DE); Ralf Kuebler, Salzburg (AT); Alfred Hoch, Ebelsbach (DE); Matthias Herrmann, Oberalm (AT); Lars Ulrich, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 1015 days.

(21) Appl. No.: 12/666,190

(22) PCT Filed: Jun. 17, 2008

(86) PCT No.: PCT/EP2008/057589
§ 371 (c)(1),
(2), (4) Date: Dec. 22, 2009

(87) PCT Pub. No.: WO2009/000698
PCT Pub. Date: Dec. 31, 2008

(65) Prior Publication Data
US 2010/0180442 A1 Jul. 22, 2010

(30) Foreign Application Priority Data
Jun. 22, 2007 (DE) .......................... 10 2007 029 305

(51) Int. Cl.
*B21K 1/24* (2006.01)
(52) U.S. Cl.
USPC .................................. 29/890.12; 29/890.122
(58) Field of Classification Search
USPC ................. 29/890.12, 890.122; 148/567, 639
See application file for complete search history.

(56) References Cited

U.S. PATENT DOCUMENTS 2,347,676 A * 5/1944 Eplett ........................... 251/359
3,459,167 A * 8/1969 Briggs et al. .................. 123/669
(Continued)

FOREIGN PATENT DOCUMENTS

| CN | 1724187 A | 1/2006 |
|---|---|---|
| DE | 3801703 C1 | 2/1989 |

(Continued)

OTHER PUBLICATIONS

ASM Handbooks Online, vol. 4, Stress-Relief Heat Treating of Steel.*

(Continued)

*Primary Examiner* — Alexander P Taousakis
*Assistant Examiner* — Matthew P Travers
(74) *Attorney, Agent, or Firm* — Michael Best & Friedrich LLP

(57) ABSTRACT

The invention relates to a method for producing an injection valve for liquids, preferably an injection valve for injecting fuel into a combustion chamber of an internal combustion engine. The injection valve has a valve body, with a valve seat which is formed therein, and a valve needle which interacts with the valve seat in order to open and close at least one injection opening. The injection valve is produced by means of the following method steps: producing the valve body from steel, hardening the valve body, annealing a partial region of the valve body at an annealing temperature. The device for carrying out the method according to the invention has an inductive annealing generator which generates a suitable alternating current for operating a coil, in the magnetic field of which coil the valve body can be heated for annealing.

18 Claims, 2 Drawing Sheets

(56) References Cited

U.S. PATENT DOCUMENTS

| | | |
|---|---|---|
| 3,596,037 A | 7/1971 | Seulin |
| 4,801,095 A | 1/1989 | Banzhaf et al. |
| 4,881,763 A | 11/1989 | Guido et al. |
| 5,534,081 A | 7/1996 | Takagi et al. |

FOREIGN PATENT DOCUMENTS

| | | | |
|---|---|---|---|
| DE | 102004035292 A1 | 2/2006 | |
| EP | 0233190 B1 | 12/1989 | |
| WO | 8700889 A1 | 2/1987 | |
| WO | 8901529 A1 | 2/1989 | |

OTHER PUBLICATIONS

D.A. Canonico, "Stress-Relief Heat Treating of Steel", Heat Treating, vol. 4, ASM Handbook, ASM International, 1991, p. 33-34.*

* cited by examiner

INJECTION VALVE, METHOD FOR ITS PRODUCTION, AND APPARATUS FOR PERFORMING THE METHOD

CROSS-REFERENCE TO RELATED APPLICATION

This application is a 35 U.S.C. 371 application of PCT/EP2008/057589 filed on Jun. 17,2008.

BACKGROUND OF THE INVENTION

1. Field of the Invention

The invention relates to a method for producing an injection valve for liquids, preferably an injection valve for injecting fuel into a combustion chamber of an internal combustion engine, and a device for carrying out the method.

2. Description of the Prior Art

A method for producing an injection valve is known for instance from European Patent EP 233 190 B1. Injection valves of the kind preferably used for injecting fuel at high pressure into a combustion chamber of an internal combustion engine are produced in a plurality of work steps. In a first work step, the actual valve body is shaped from steel, the steel being still unhardened and thus easily machined. After the production of the outer and inner shape of the injection valve, the valve is subjected to a hardening process, in which the injection valve is severely heated and then quenched. For eliminating stresses that are caused by the uneven cooling down of the valve body, the hardening is followed by a heat treatment of the valve body, that is, a first annealing, in which the valve body is held for a certain period of time at an elevated temperature below the hardening temperature, until the stresses that have built up are adequately reduced. The valve body can be heated by various methods, for instance in an oil bath or by inductive heating, which is known for instance from German published patent application DE-OS 1 292 696.

Injection valves of the kind used for injecting fuel at high pressure into combustion chambers of internal combustion engines operate in the following way: A valve needle is disposed longitudinally displaceably in the valve body and cooperates with a valve seat for opening and closing at least one injection opening. By a longitudinal motion of the valve needle, the injection is initiated and interrupted, so that a precise injection of fuel at high pressure into the combustion chamber is attained. This puts a severe strain on the valve needle in the region where it is guided and on the valve seat, but wear is lessened by the aforementioned hardening of the valve body.

In modern valve bodies, upon their first use once engine operation has begun, a partial transformation of the microstructure of the material takes place, which leads to a change in shape in the nozzle seat at the place where the valve needle is seated on the nozzle. This change in shape causes a change in the quantity injected, so that the injection valve no longer operates as it did when it was new, which is especially disadvantageous in common rail injection systems.

It is not possible to optimize the valve body in every respect: Longer annealing at higher temperatures does increase the toughness of the steel but also lessens its hardness, so that the wear in the region of the valve seat and of the needle guidance becomes greater. On the other hand, if the annealing is done at lower temperatures or for a shorter time, then the valve body remains relatively brittle, and cracks can occur, particularly in the region of the valve seat.

ADVANTAGES AND SUMMARY OF THE INVENTION

The method according to the invention for producing an injection valve has the advantage that the transformation in the microstructure that occurs in injection valves is anticipated by two successively performed heat treatments. These heat treatments for reducing the internal stresses (annealing) have the effect that the change in quantity associated with the microstructural transformation does not occur in operation and hence afterward, and thus the injection properties of the injection valve remain constant over its entire service life. To that end, after the production and hardening, the entire valve body is annealed at a temperature $T_1$. Next, a second annealing process follows, in which only a partial region of the valve body is heated, this partial region including the valve seat, and this is done at an annealing temperature $T_2$ that is higher than the first annealing temperature $T_1$. As a result, the hardness of the valve body, in the region where the valve needle is guided, is preserved to a sufficient extent, and wear is thus correspondingly low. On the other hand, the valve seat is intentionally made tougher by the increased annealing temperature, so that brittle failure in this region is avoided. The temperature of the first annealing process $T_1$ is below the second annealing temperature $T_2$ and amounts to from 150 to 240° C., preferably being approximately 180° C.

In a first advantageous refinement of the method, the valve body is filled with a fluid during the second annealing, and this fluid is under pressure, preferably being at the maximum incident pressure at which the injection valve is to be operated. As a result, especially whenever the valve needle is likewise urged by a force in the direction of the valve seat, conditions are created of the kind that occur also upon first use of the injection valve once engine operation has begun. If the second annealing process is performed under these conditions, the aforementioned microstructural transformation in the steel of the valve body occurs and hence there is compensation between the valve needle and the valve seat, so that the process that not daily takes place upon first operation of the injection valve is already anticipated here. The thus-altered injection behavior of the injection valve can be taken into account by suitable programming of the engine control unit, so that a further change in the injection behavior after installation in the engine need not be expected.

In a further advantageous feature, the second annealing takes place by inductive heating of the valve body. By a suitable design of the coil that generates the corresponding alternating magnetic field, the valve body can be heated very purposefully in the desired region to the appropriate temperature. Preferably, the valve body is heated to a temperature of the kind that also occurs during engine operation in the valve body as a result of the heat in the combustion chamber. A second annealing temperature of 250 to 400° C. has proved especially advantageous, given a first annealing temperature of 160 to 240° C.

BRIEF DESCRIPTION OF THE DRAWINGS The invention will be described in further detail below in two exemplary embodiments in conjunction with the associated drawings, in which.

DESCRIPTION OF THE PREFERRED EMOBODIMENTS

Figure 1:
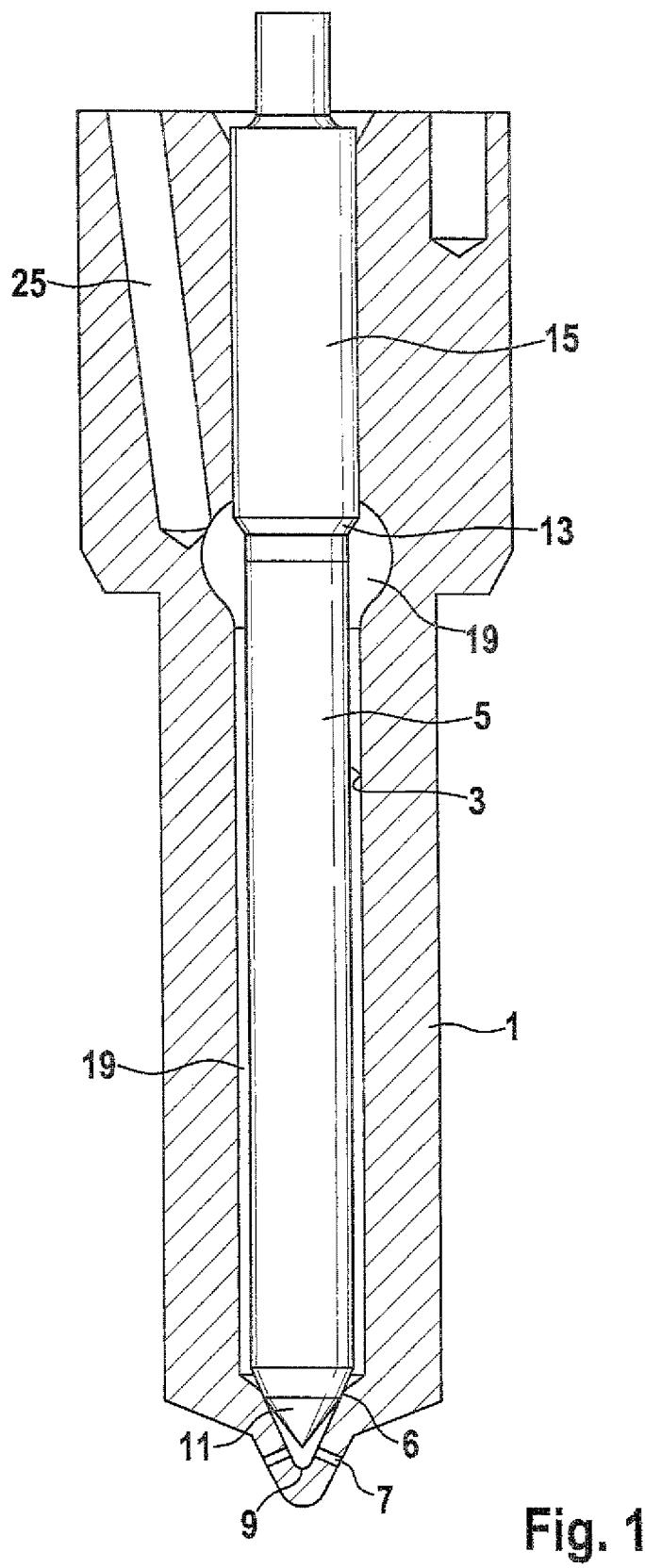
FIG. 1 shows a longitudinal section through an injection valve which can be produced by the method of the invention.

FIG. 1 shows a longitudinal section through an injection valve which can be produced by the method of the invention. The injection valve, which in an internal combustion engine is connected to an injector body, not shown in FIG. 1, has a valve body 1 in which a bore 3 is made. The bore 3 is defined, on its end toward the combustion chamber, by a valve seat 6, which has an essentially conical shape and opens into a blind bore 9. A plurality of injection openings 7, through which the fuel is ejected in operation of the injection valve, extend from the blind bore 9. A valve needle 5 embodied in pistonlike shape is disposed longitudinally displaceably in the bore 3, and on its end remote from the valve seat it has a guide portion 15, with which the valve needle is guided in fluid-tight fashion in the bore 3. As a result, a pressure chamber 19, which surrounds the valve needle 5 between the guide portion 15 and the valve seat 6, is sealed off by the slight guidance play in the region of the guide portion 15.

In its end toward the valve seat the valve needle 5 has a sealing face 11, which is likewise embodied essentially conically and with which the valve needle 5 cooperates with the valve seat 6. The valve needle 5 cooperates with the valve seat 6 in such a way that when the sealing face 11 becomes seated on the valve seat 6, the injection openings 7 are sealed off from the pressure chamber 19, while when the valve needle 5 is lifted from the valve seat 6, the blind bore 9 and thus the injection openings 7 communicate with the pressure chamber 19. In turn, the pressure chamber 19 then fills with fuel at high pressure via an inlet bore 25 extending in the valve body 1.

The longitudinal motion of the valve needle 5 inside the bore 3 is controlled by the ratio of a closing force, which acts on the end of the valve needle 5 remote from the valve seat, and the hydraulic force, which is exerted on parts of the sealing face 11 and on a pressure shoulder 13 by the pressure in the pressure chamber. Since the individual injections, especially when the injection valve is used in high-speed self-igniting internal combustion engines, occur in a very short time and in very rapid succession, the valve needle 5 must be moved with strong force and at a high speed. This makes stringent mechanical demands of the valve needle 5 itself and of the valve body 1, especially in the region of the valve seat 6.

In order to construct an injection valve to meet these demands, it is produced according to the invention by the following method: First, the valve body is produced from steel; the steel is not yet hardened and has good machinability, for instance by forging or by material-removing processes. Once the outer shape and the bore, including the valve seat, have been produced, the valve body is hardened, preferably case-hardened, in order to attain suitable hardness and wear resistance. Since in the hardening process strong intrinsic stresses occur inside the valve body, and furthermore after the hardening the valve body is still quite brittle, a fracture in the region of the valve seat 6 would easily occur during operation. To prevent this, the hardening process is followed by a heat treatment, in which the entire valve body 1 is heated to a temperature $T_1$, which preferably amounts to from 150 to 240° C., and is held for a period of time at that temperature. By means of this heat treatment, intrinsic stresses inside the valve body diminish, and the toughness of the material increases.

In modern valve bodies, on first use of the entire installed injector in the guide portion, a partial transformation of the microstructure of the material takes place in the region of the valve seat 6. This leads to changes in shape in the valve seat 6 and thus to a change in the injected quantity, which is disadvantageous, especially in common rail injection systems. This is explained by the fact that once operation has begun, the tip of the injection valve, which is toward the combustion chamber and is where the valve seat 6 is located, is subjected both to the heat of the combustion chamber and to strong hydraulic and mechanical forces by the valve needle 5 and by the high fuel pressure present in the pressure chamber 19, which can amount to up to 2000 bar. To anticipate this transformation in the microstructure, in the production method of the invention a second annealing process of the valve body 1 is provided, in the region that is subjected to the increased engine temperature, which in operation can amount to up to 300° C. This region is the end region of the valve body 1 where the valve seat 6 is also located. Accordingly, after the hardening and first annealing, the valve body 1 is subjected to a second annealing process at a temperature $T_2$, which essentially corresponds to the temperature that occurs in the injection valve once engine operation has begun.

Figure 2:
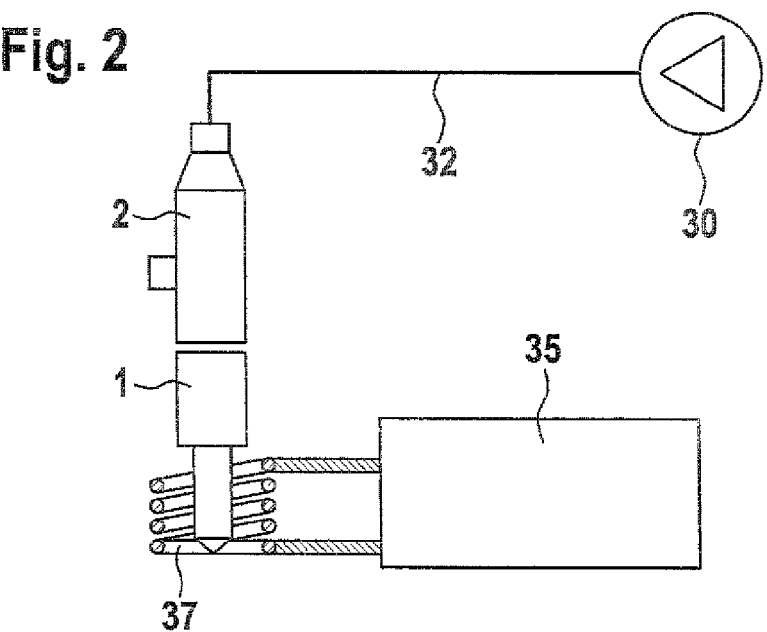
FIG. 2 shows a first embodiment of the injection valve according to the invention shown in FIG. 1.

In principle, heating the valve body 1 can be done in various ways: It can be done conventionally, for instance in an oil bath, by dipping the valve body 1 to the desired height into the hot oil. However, heating by means of an induction process has proved especially advantageous, in which the valve body 1 is placed in a coil to which a suitable alternating current is applied. The magnetic field occurring inside the coil induces eddy currents in the valve body, which assure heating and thus increase the temperature of the valve body purposefully in the region that is subjected to the magnetic field. This inductive annealing can happen very quickly, and in the case of a valve body it takes only a few seconds. FIG. 2 shows a suitable arrangement for this, which includes an inductive annealing generator 35 that generates a suitable alternating current and conducts it through a coil 37. Inside the coil, the aforementioned alternating magnetic field occurs, and the coil 37 is dimensioned such that the valve body 1 can be disposed with its end toward the valve seat inside the coil 37. In the embodiment shown in FIG. 2, the valve body 1 is connected to an injector body 2, so that all in all, a fuel injector is formed that can be installed in an internal combustion engine in order there to inject fuel into a combustion chamber.

The balance between the valve seat 6 and the valve needle 5 in the inductive annealing is especially effective whenever the injector is subjected to the conditions that also occur in operation in the engine, that is, to the corresponding forces and the requisite fuel pressure. For that purpose, in the annealing the injector can fill with fuel at high pressure, but without an injection taking place. To that end, via a high-pressure line 32, the injector body 2 is made to communicate with a high-pressure pump 30, which makes a suitable fuel pressure available and puts the injector body 2, precisely like the valve body 1, under high fuel pressure. Under these conditions, the valve needle 5 is also pressed with strong force against the valve seat 6, so that a corresponding balance between the valve seat 6 and the valve needle 5 or sealing face 11 occurs in the inductive annealing. This annealing process can be done with the injector in its fully installed state, or in other words as the final process step in the production of the entire fuel injector.

Figure 3:
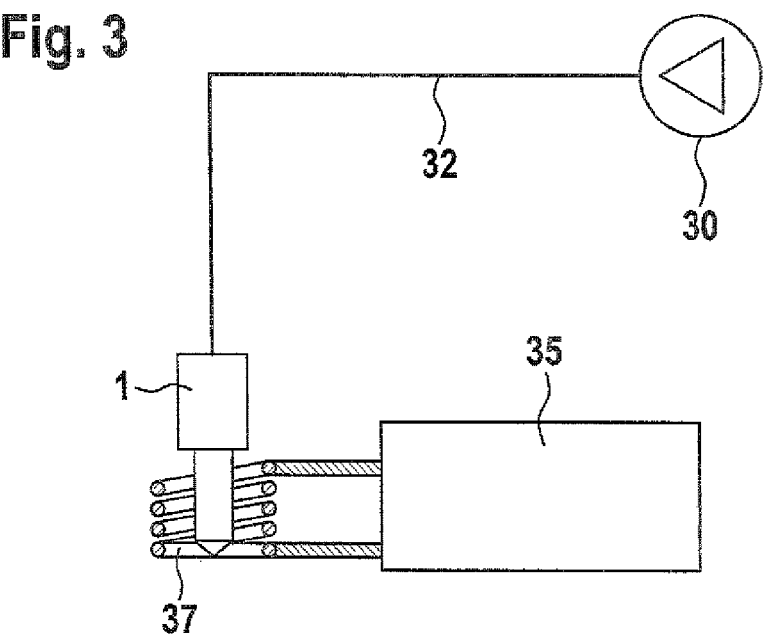
FIG. 3 shows a second embodiment of the injection valve according to the invention.

FIG. 3 shows an apparatus for inductive annealing which is practically equivalent to what is shown in FIG. 2, but here only the injection valve, after its manufacture, is inductively annealed without being connected to an injector body. Once again, fuel is introduced into the valve body 1 at high pressure via the high-pressure pump 30 and the high-pressure line 32; the valve needle is either stopped or is pressed by a different device against the valve seat 6 with a suitable force.

Figure 4:
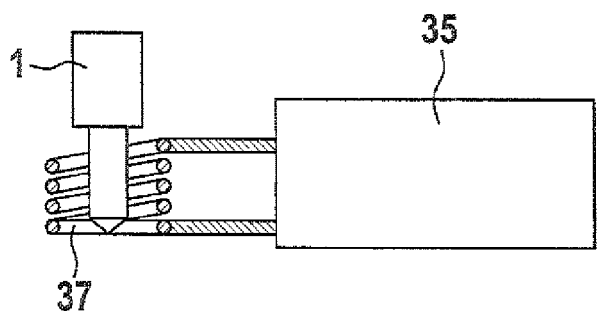
FIG. 4 shows a third embodiment of the injection valve according to the invention.

A further alternative method and its apparatus are shown in FIG. 4. Here, the valve body 1 is subjected to an inductive annealing process that ensues immediately after the heat treatment of the valve body 1. This process step can indeed be integrated quite economically into the overall manufacture of the valve body 1, but that has the disadvantage that grinding processes still follow, and no balance between the valve needle 5 and the valve seat 6 is established.

By the inductive annealing of the end region of the valve body 1, only that region is increased in its toughness, and because of the skin effect, that is, the fact that the eddy currents are generated primarily at the surface of the metal valve body 1, only the surface of the valve body 1 is made tougher, while the remainder of the valve body 1 is given a greater hardness. Since the annealing process does not affect the region of the bore 3 remote from the valve seat, the good wear properties of the hardened valve body 1 in the region of the guide portion 15 of the valve needle 5 are unimpaired.

The first annealing of the valve body 1 is typically done at a temperature $T_1$ of from 150 to 240° C., preferably at approximately 180° C. The temperature during the second annealing in the end region of the valve body preferably amounts to from 250 to 400° C., and a temperature of from 270 to 300° C. is especially advantageous. The applied fuel pressure preferably corresponds precisely to the maximum pressure that occurs in operation of the injection valve in the engine, but it may also be lower. This means a fuel pressure that at maximum is approximately 1600 to 2000 bar.

The foregoing relates to the preferred exemplary embodiments of the invention, it being understood that other variants and embodiments thereof are possible within the spirit and scope of the invention, the latter being defined by the appended claims.

The invention claimed is:

1. A method for producing an injection valve for liquids which has a valve body with a valve seat embodied therein and a valve needle that cooperates with the valve seat for opening and closing at least one injection opening, comprising the following method steps:
   producing the valve body from steel;
   hardening the valve body;
   first annealing of the entire valve body at a first annealing temperature;
   second annealing of a partial region of the valve body at a second annealing temperature, wherein the first annealing temperature being lower than the second annealing temperature;
   wherein the valve body is filled with a liquid during the second annealing.

2. The method as defined by claim 1, wherein the partial region includes the valve seat.

3. The method as defined by claim 1, wherein the liquid is under pressure.

4. The method as defined by claim 3, wherein the valve needle is pressed against the valve seat with a force during the annealing.

5. The method as defined by claim 4, wherein the valve needle is pressed against the valve seat with a maximum force that occurs in operation of the injection valve.

6. The method as defined by claim 1, wherein the first annealing and/or the second annealing is performed by inductive heating of the valve body.

7. The method as defined by claim 1, wherein the injection valve is an injection valve of the kind for injecting fuel at high pressure into a combustion chamber of an internal combustion engine, and in the second annealing, the part of the valve body is heated that is also heated the most by heat in the combustion chamber during the operation of the engine.

8. The method as defined by claim 1, wherein the second annealing temperature is 250 to 400° C.

9. The method as defined by claim 1, wherein the first annealing temperature is 160 to 240° C.

10. A method for producing an injection valve for fluids, which has a valve body with a valve seat embodied therein and a valve needle that cooperates with the valve seat for opening and closing at least one injection opening, comprising the following method steps:
    producing the valve body from steel;
    hardening the valve body;
    first annealing of the entire valve body at a first annealing temperature; and
    second annealing of a partial region of the valve body at a second annealing temperature, wherein the first annealing temperature being lower than the second annealing temperature;
    wherein the valve body is filled with a fluid during the second annealing, said fluid being under pressure, and
    wherein the pressure corresponds to the maximum incident pressure at which the injection valve ejects the fluid in operation.

11. The method as defined by claim 10, wherein the valve needle is pressed against the valve seat with a force during the annealing.

12. The method as defined by claim 11, wherein the valve needle is pressed against the valve seat with a maximum force that occurs in operation of the injection valve.

13. The method as defined by claim 12, wherein the first annealing and/or the second annealing is performed by inductive heating of the valve body.

14. The method as defined by claim 13, wherein the injection valve is an injection valve of the kind for injecting fuel at high pressure into a combustion chamber of an internal combustion engine, and in the second annealing, the part of the valve body is heated that is also heated the most by heat in the combustion chamber during the operation of the engine.

15. The method as defined by claim 10, wherein the valve body is filled with a liquid during the second annealing.

16. A method for producing an injection valve for fluids, which has a valve body with a valve seat embodied therein and a valve needle that cooperates with the valve seat for opening and closing at least one injection opening, comprising the following method steps:
    producing the valve body from steel;
    hardening the valve body;
    first annealing of the entire valve body at a first annealing temperature; and
    second annealing of a partial region of the valve body at a second annealing temperature, wherein the first annealing temperature being lower than the second annealing temperature;
    wherein the valve needle is pressed against the valve seat with a force during the annealing.

17. The method as defined by claim 16, wherein the valve needle is pressed against the valve seat with a maximum force that occurs in operation of the injection valve.

18. The method as defined by claim 16, wherein the valve body is filled with a liquid during the second annealing.

\* \* \* \* \*

UNITED STATES PATENT AND TRADEMARK OFFICE
CERTIFICATE OF CORRECTION

PATENT NO.       : 8,595,933 B2                                               Page 1 of 1
APPLICATION NO.  : 12/666190
DATED            : December 3, 2013
INVENTOR(S)      : Zeiss et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1016 days.

Signed and Sealed this
Twenty-second Day of September, 2015

Michelle K. Lee
*Director of the United States Patent and Trademark Office*